United States Patent [19]

Newman

[11] Patent Number: 4,864,897
[45] Date of Patent: Sep. 12, 1989

[54] CHAIN SAW SHARPENING TOOL

[76] Inventor: Charles Newman, 32100 Obaley Dr., Fort Bragg, Calif.

[21] Appl. No.: 200,794

[22] Filed: Jun. 1, 1988

[51] Int. Cl.⁴ .............................................. B23D 63/16
[52] U.S. Cl. ...................................... 76/31; 76/25 A; 76/36
[58] Field of Search ............................ 76/36, 31, 25 A

[56] References Cited
U.S. PATENT DOCUMENTS

| 3,172,306 | 3/1965 | Kephart, Jr. | 76/36 |
| 3,172,307 | 3/1965 | Kephart, Jr. | 76/25 A |
| 3,283,615 | 11/1966 | Kephart, Jr. | 76/36 |
| 4,594,919 | 6/1986 | Southard | 76/36 |

*Primary Examiner*—Roscoe V. Parker
*Attorney, Agent, or Firm*—Bruce & McCoy

[57] ABSTRACT

A chain saw sharpening tool having a channel section which fits over a saw chain and cutter bar and has a file holder guide secured thereto for engaging a file holder and orienting it with respect to the saw chain during filing of the saw chain teeth for sharpening.

9 Claims, 2 Drawing Sheets

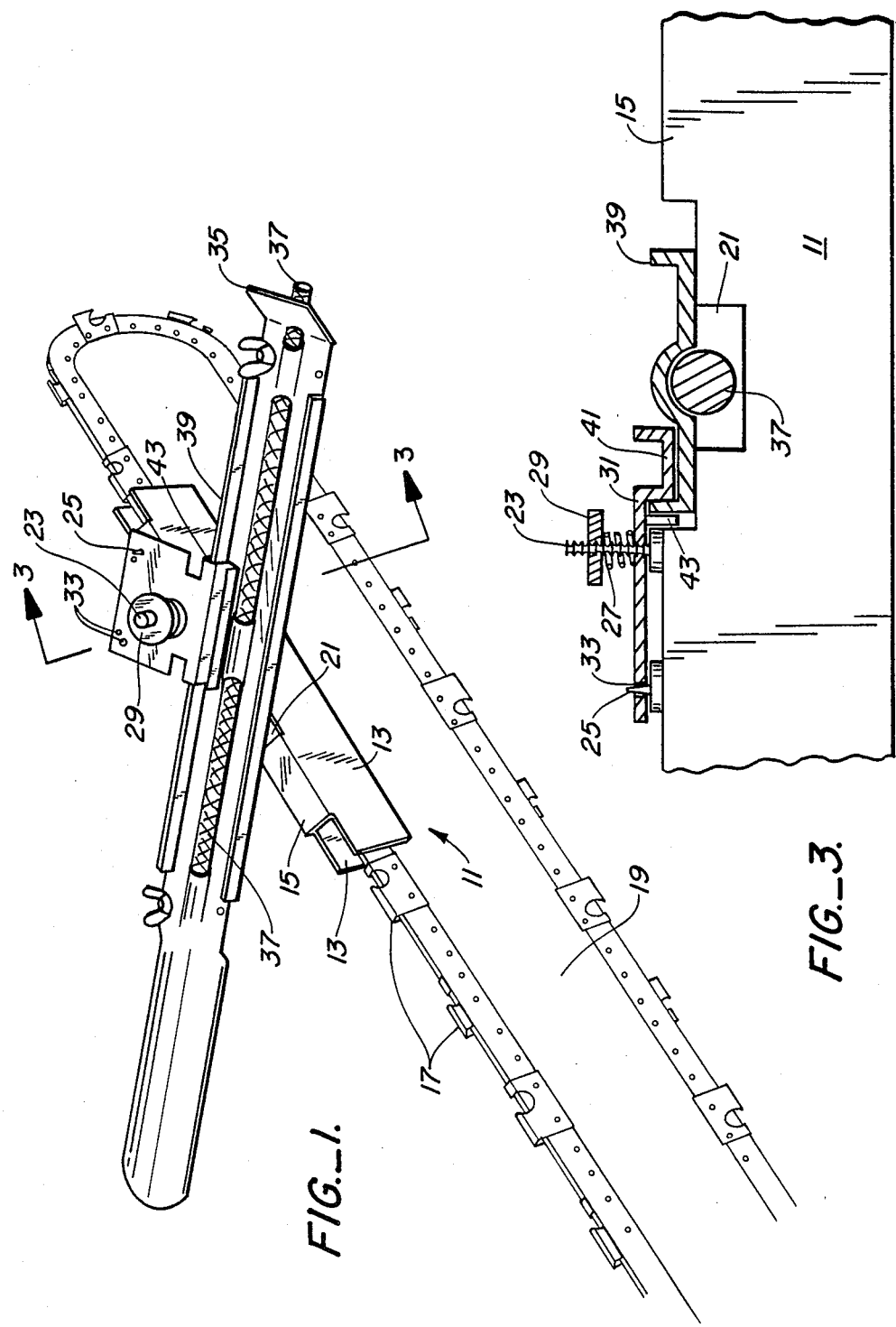

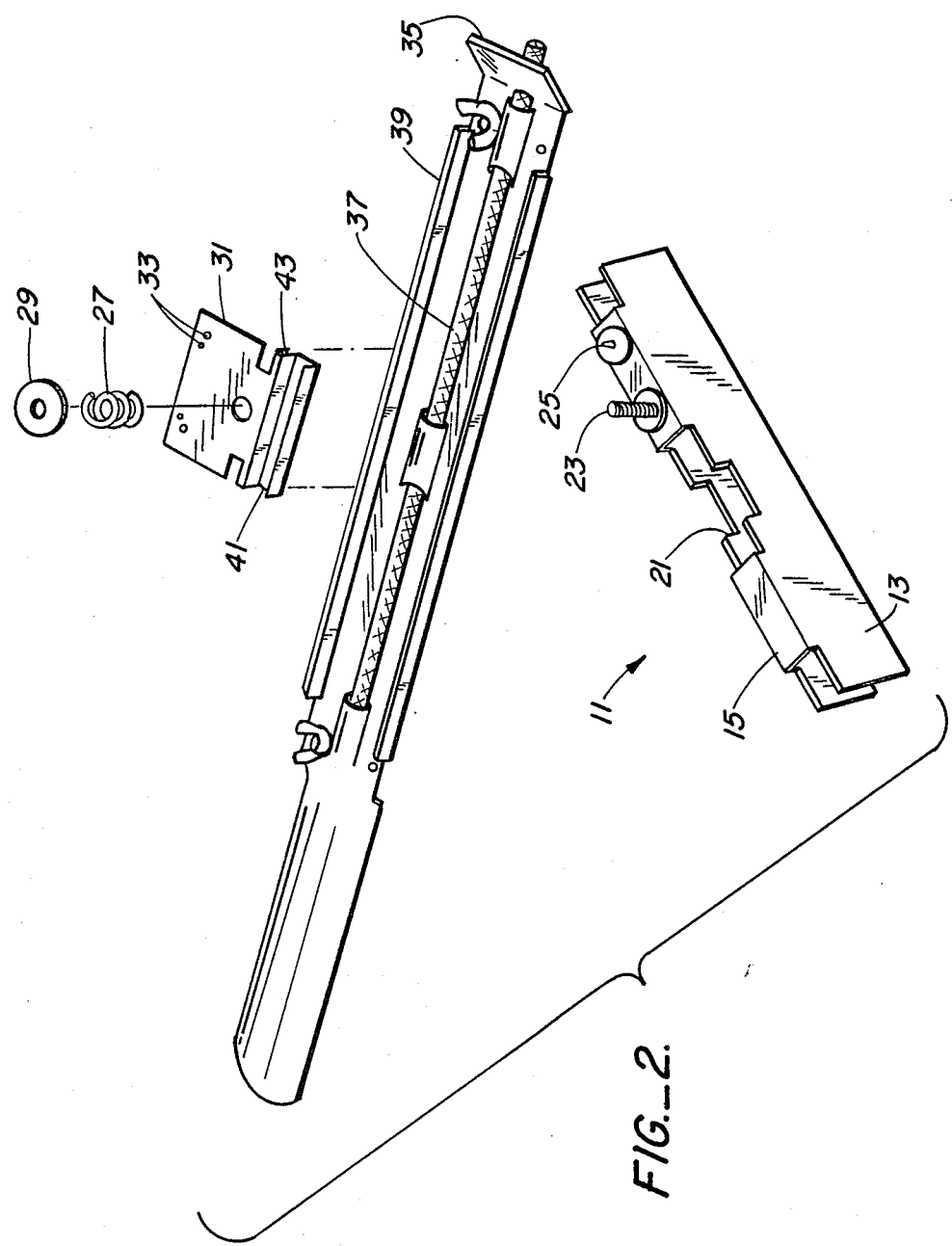
FIG._2.

CHAIN SAW SHARPENING TOOL

BACKGROUND OF THE INVENTION

1. Field of the Invention

The present invention relates to chain saw sharpening tools and more particularly to a chain saw sharpening tool which engages a saw chain and cutter bar and has a file holder which is guided during sharpening with respect to the cutter teeth of the saw chain by the portion of the tool which is engaged with the saw chain.

2. Description of the Prior Art

Many devices have been developed to aid a person in the sharpening of chain saw cutting teeth. Primarily, it is a question of orienting the file which sharpens the chain saw cutting teeth with respect to the cutting edges of those teeth and maintaining that orientation during the filing sharpening stroke of the file. First the file must be angulated in the horizontal plane with respect to the leading or cutting edge of the cutter tooth because the cutting edge is raked with respect to the forward movement of the tooth in the cutting bar of the saw chain. In addition, the file handle must be angulated in a vertical orientation as most teeth are formed with a sloping head which generally is a ten degree slope.

Thus, for a person to sharpen a tooth freehand without the aid of a guide or guage, the sharpening process is not accurately done by even those with a great deal of experience. It is just too difficult to hold both angles accurately for freehand sharpening. The problem is especially exacerbated when the angles must be reversed for each tooth as they alternate in their rake and slope with respect to the forward direction of the chain. Almost every person has a preferable orientation for stroking the file, either right-handed or left-handed, whereby changing orientation to the less preferred angles are not as accurately tracked during filing as during the preferred orientation.

In order to overcome these problems, many devices have been provided for aiding in the sharpening of saw chains. Some devices require the dismantling of the chain from the saw and placing each individual tooth in a vise which permits the file to be accurately tracked across the face of the tooth. Improvements on that type of a device have included sharpeners which clamp directly to the cutter bar of the saw chain and then sharpen each tooth as it is moved past the clamped-on device. However, accurately positioning teeth with respect to the cutter bar is difficult because the chain is not easily moved in the cutter bar due to its engagement with the motor. Thus, those types of devices must be moved back and forth which means attaching and detaching for sharpening each individual tooth.

Simpler devices have been developed which simply provide a reference angle for the file as it is being freehand-moved for sharpening the teeth. The advantage to these devices is that they are not clamped to the saw chain cutter bar and can be easily moved along the saw chain for filing each successive tooth without having to detach or disassemble the gauge. The problem is that these gauges do not provide an accurate positive engagement with the file holder for insuring that the file accurately tracks during the sharpening strokes.

The present invention overcomes the problems of each of these devices by providing a gauge which fits over the saw chain and cutter bar and is easily slid therealong without having to attach or detach it from either the chain or cutter bar. In addition, the guage engages the file holder to guide it during each stroke in repetitive tracking reciprocation. Further, the engagement means of the present invention allows easy and quick change engagement or disengagement of the file holder with the guide and also allows quick change reorientation of the guide with respect to the saw chain for alternating the angles of sharpening.

SUMMARY OF THE INVENTION

The present invention is a chain saw sharpening tool which includes a channel section having a generally square inverted U-shaped cross-section with a pair of side walls and a connecting wall forming the top of the channel. The channel section is formed for mounting over a saw chain installed in a cutting bar and having an opening formed in the top of the channel section through which the individual teeth of the saw chain can be sharpened. A pair of studs project from the top of the channel adjacent to the opening. The first of the studs is a pivot post for a file guide and the other of the studs is a locator pin.

A file holder having guide means formed along both edges of the holder parallel to the disposition of a file in the holder is provided for engaging a file holder guide. The file holder guide is mounted on the pivot post of the channel section and is formed for engaging the guide means of the file holder. The guide also has locator holes for engaging the locator pin which projects from the channel section. The channel section is placed over the top of the saw chain mounted in the cutting bar of the chain saw. The file holder is engaged with the file holder guide and the guide is oriented with respect to the saw chain by means of the locator pins which engage the file holder guide at the correct position. The file is then reciprocated in its engagement with the file holder guide to sharpen the individual teeth of the saw chain which the tool has been located over.

OBJECTS OF THE INVENTION

It is therefore an important object of the present invention to provide a saw chain sharpener which fits onto a saw chain and cutter bar and does not need to be clamped thereto and which can easily be moved along the saw chain to the next tooth for sharpening without disassembly of the tool or removing the tool from the chain saw.

It is another object of the present invention to provide a saw chain sharpening tool which engages a file holder with spring pressure, for guiding the holder during filing of the saw chain teeth, but with a quick release engagement means to permit the file holder to be either removed from engagement with its guide or quickly reoriented with respect to the saw chain for filing the next tooth.

It is a further object of the present invention to provide a file holder engagement means for a chain saw sharpening tool which permits accurate filing of alternately angled cutter teeth of a saw chain.

It is yet another object of the present invention to provide a file holder engagement means and guide which can be quickly switched from one predetermined angulated cut to another reverse angulated predetermined cut by simply lifting the file holder guide against spring pressure and reorienting the file holder guide and engaging a different locator pin which establishes the predetermined angle.

It is still a further object of the present invention to provide a saw chain filing guage which quickly alternates from one rake angle to another, as well as changing the vertical orientation angle equally as fast.

Other objects of the present invention will become apparent when the description of the preferred embodiment thereof is considered in conjunction with the accompanying drawings.

BRIEF DESCRIPTION OF THE DRAWINGS

FIG. 1 is a perspective view of the saw chain sharpening tool of the present invention mounted on a saw chain and cutter bar in operative position;

FIG. 2 is an exploded view of the parts of the saw chain sharpening tool of the present invention; and FIG. 3 is a cross-section taken along lines 3—3 of FIG. 1.

DESCRIPTION OF THE PREFERRED EMBODIMENT

The preferred embodiment of the chain saw sharpening tool of the present invention has a basic frame member 11 which is a channel section having a generally square inverted U-shaped cross-section. The side walls 13 of the channel have a connecting wall 15 which forms the top of the channel. The channel section is formed for mounting over a saw chain 17 which is installed in the track of a cutting bar 19 of the chain saw.

In the simplest description of the channel 11, it would be considered simply a guide member for the file which is used to sharpen the chain saw cutting teeth. However, the channel section of the present invention is formed with the side walls 13 angled slightly outward, away from each other, forming a gauge. When the channel is rocked to one side when it straddles the saw chain and the cutter bar, the top surface of the channel is angulated in the vertical direction with respect to the saw chain. This permits the file to be oriented to approximately ten degrees of vertical orientation or slope for cutting the front edge of a sloped cutter tooth. Reversing the rocked orientation of the guage on the saw chain reverses the vertical orientation for sharpening the next cutter tooth.

An opening 21 is formed in the top of the channel section, generally in the middle thereof, through which the individual teeth of the saw chain can be sharpened. The opening has a center portion which includes the removal of a portion of the height of both side walls 13 of said channel 11 adjacent to and forming a portion of the opening.

A pair of studs 23, 25 project from the top of the channel 11 adjacent to the opening 21. The first of the studs 23 is a pivot post for a file guide and the other of the post studs 25 is a locator pin. In the preferred embodiment, the first stud or pivot post is provided with a coil spring 27 which encircles the post and is held on the post by a knurled nut 29 which is secured upon the post above the spring.

A file holder guide 31 is mounted on the pivot post 23 below the spring 27. The guide has locator holes 33 at the corners thereof for engaging the locator pin 25. The locator pin and holes orient the guide at predetermined angles with respect to the channel section.

A file holder 35 is provided which has guide means formed along both edges of the holder parallel to the disposition of a file 37 in the holder. The guide means are formed for engaging the file holder guide 31. In the preferred embodiment, the guide means which are formed on the file holder are upwardly projecting walls 39 of uniform height which are formed along both edges of the file holder.

The file holder guide 31 includes a guide surface 41 disposed for mating with and engaging in semi-captured relation the projecting wall guides 39 of the file holder 35 whereby as the file holder is reciprocated in the opening 21 of the channel section 11, the file holder is kept properly angularly oriented with respect to the channel as a result of the interaction of the guide surface formed on the file holder guide and the guide walls of the file holder.

In operation, the file holder guide 31 is raised sufficiently on the pivot post 23 against the spring pressure 27 whereby one of the edges 39 of the file holder 35 can be inserted under the file holder guide 31 whereby it engages the guide surface 41 of the file holder guide. Tabs 43 formed by the file holder guide are disposed in spaced relation to the guide surface whereby the walls 39 of the file holder are captured therebetween when the file holder is in operative position on the guide channel 11 and with respect to the file holder guide. After the side walls of the file holder have been engaged with the file holder guide, the file holder guide is rotated in the horizontal plane until the locator pin 25 projects through one of the file holder guide holes thus locking the guide in a predetermined position and the file holder in an angulated orientation with respect to the channel section. This angulation is aligned with the cutting edge of the cutter tooth of the saw chain. Each successive cutter tooth is formed with a angulated cutter face which is just the reverse of the preceding face so that in sharpening each successive tooth, the file holder must be angulated to a reverse angle from that of the previous tooth. To do that, the file holder guide is raised up against the spring pressure 27 and rotated approximately 90° until the locator post engages the locator hole on the file holder guide at the reversed predetermined angulated position.

After the proper angulation is achieved to cut the rake on the cutter tooth, the channel guide must then further be rocked to vertically orient the file with respect to the receding or sloped head of the top of the cutter tooth which is sloped at approximately ten degrees. Each time a successive tooth is sharpened, the angulation in the vertical direction must also be reversed as well as the angulation with respect to the rake or cutting edge of the cutter tooth. Most operators file all cutters on one side of the saw chain and then all of the cutters on the other side of the saw chain so they do not have to successively change angles.

The bottom of the file holder rests on the top of the cutter tooth, both on the top surface of the cutting head of the tooth and on the depth guide at the front of the tooth, such that it does not rest on the channel section but on the tooth so that every tooth is sharpened to the same depth.

Thus, it will be seen from this description of the preferred embodiment of the present invention that the chain saw sharpening tool disclosed and described herein achieves the objects and advantages attributable thereto, and while the invention has been described in considerable detail, it is not to be limited to such details as set forth except as may be necessitated by the appended claims.

I claim:

1. A chain saw sharpening tool comprising a channel section having a generally square inverted U-shaped cross-section with a pair of side walls and a connecting wall forming the top of the channel, said channel section being formed for mounting over a saw chain installed in a cutting bar and having an opening formed in the top of the channel section through which the individual teeth of the saw chain can be sharpened, a pair of studs projecting from the top of said channel adjacent to said opening, the first of said studs being a pivot post for a file guide and the other of said studs being a locator pin, a file holder having guide means formed along both edges of said holder parallel to the disposition of a file in the holder, said guide means formed for engaging a file holder guide, and a file holder guide mounted on said pivot post and formed for engaging the guide means of said file holder, said file holder guide having locator holes for engaging said locator pin.

2. The chain saw sharpening tool of claim 1 wherein the guide means formed on the file holder are upwardly projecting walls of uniform height formed along both edges of said file holder.

3. The chain saw sharpening tool of claim 2 wherein said file holder guide includes a guide surface disposed for mating with and engaging in semi-captured relation the projecting wall guides of said file holder whereby as said file holder is reciprocated in the opening of said channel section, the file holder is kept properly angularly oriented with respect to said channel by means of the interaction of the guide surface formed on the file holder guide and the guide walls of said file holder.

4. The chain saw sharpening tool of claim 1 wherein the opening formed in said channel has a center portion which includes the removal of a portion of the height of both side walls of said channel adjacent to and forming a portion of said opening, said opening at the top of said channel allowing said file holder to reciprocate on the top of saw chain tooth and its depth guage.

5. The chain saw sharpening tool of claim 1 wherein a means is provided for securing said file holder guide to the channel section with a pressure engagement thereby holding said guide in contact with said file holder guide walls and engaged with said locator pins.

6. The chain saw sharpening tool of claim 1 wherein said channel section is formed with the side walls angled slightly outward away from each other whereby when the channel is rocked to one side when it straddles the saw chain and cutter bar, the file holder is angulated in the vertical direction with respect to the saw chain.

7. A chain saw sharpening tool comprising a channel section having a generally square inverted U-shaped cross-section with a pair of side walls which are angled slightly outward away from each other and a connecting wall forming the top of the channel, said channel section being formed for mounting over a saw chain installed in a cutting bar and having an opening formed in the top of the channel section through which the individual teeth of the saw chain can be sharpened, said opening having a center portion which includes the removal of a portion of the height of both the side walls of said channel adjacent to and forming a portion of said opening whereby a file holder can reciprocate on the top of a saw chain tooth and its depth guage, a pair of studs projecting from the top of said channel adjacent to said opening, the first of said studs being a pivot post for a file guide and the other of said studs being a locator pin, a file holder having upwardly projecting guide walls of uniform height formed along both edges of said holder parallel to the disposition of a file in the holder, said guide walls formed for engaging a file holder guide, a file holder guide mounted on the pivot post of said channel section, said guide including a guide surface disposed for mating with and engaging in semi-captured relation the projecting wall guides of said file holder whereby as said file holder is reciprocated in the opening of said channel section, said file holder guide also including locator holes for engaging said locator pin, and means for securing said file holder guide to the channel section with a pressure engagement thereby holding said guide in contact with said file holder guide walls and engaged with said locator pin.

8. The chain saw sharpening tool of claim 7 wherein the file holder guide includes a flanged surface at the edge thereof which forms the guide surface and a pair of tabs spaced therefrom and parallel thereto which guide the walls of the file holder between the tabs and the flanged surface.

9. The chain saw sharpening tool of claim 7 wherein the means for securing the file holder guide to the channel section includes providing said pivot post with a spring for urging said file holder guide towards said channel section.

* * * * *